United States Patent
Plasek et al.

(10) Patent No.: US 9,727,612 B2
(45) Date of Patent: Aug. 8, 2017

(54) HANDLING OF ANALYTIC QUERIES

(71) Applicants: James M Plasek, Roseville, MN (US); Jennifer J Smith, Roseville, MN (US)

(72) Inventors: James M Plasek, Roseville, MN (US); Jennifer J Smith, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 336 days.

(21) Appl. No.: 14/507,912

(22) Filed: Oct. 7, 2014

(65) Prior Publication Data
US 2016/0098454 A1 Apr. 7, 2016

(51) Int. Cl.
*G06F 17/30* (2006.01)

(52) U.S. Cl.
CPC .. *G06F 17/30495* (2013.01); *G06F 17/30339* (2013.01); *G06F 17/30345* (2013.01); *G06F 17/30448* (2013.01); *G06F 17/30498* (2013.01); *G06F 17/30389* (2013.01); *G06F 17/30427* (2013.01); *G06F 17/30469* (2013.01)

(58) Field of Classification Search
CPC ......... G06F 17/30469; G06F 17/30864; G06F 17/30389; G06F 17/30427; G06F 17/30442; G06F 17/30451; G06F 17/30463
USPC ............... 707/765, 754, 718, 719, 756, 759
See application file for complete search history.

(56) References Cited

U.S. PATENT DOCUMENTS

| | | | | |
|---|---|---|---|---|
| 6,665,664 B2* | 12/2003 | Paulley | ............ | G06F 17/30448 707/999.002 |
| 7,136,850 B2* | 11/2006 | Keller | ............... | G06F 17/30469 707/999.002 |
| 7,249,120 B2* | 7/2007 | Bruno | ............... | G06F 17/30469 707/999.002 |
| 8,015,178 B2* | 9/2011 | Moeller | ............ | G06F 17/30439 707/715 |
| 2003/0163461 A1* | 8/2003 | Gudbjartsson | .... | G06F 17/30595 707/999.003 |
| 2010/0121868 A1* | 5/2010 | Biannic | ............... | G06F 17/3097 707/759 |
| 2011/0225038 A1* | 9/2011 | Fontoura | ........... | G06F 17/30501 705/14.49 |
| 2013/0262443 A1* | 10/2013 | Leida | ................ | G06F 17/30427 707/722 |
| 2015/0074134 A1* | 3/2015 | Beavin | ............. | G06F 17/30448 707/759 |
| 2015/0234888 A1* | 8/2015 | Ahmed | ............ | G06F 17/30451 707/765 |

* cited by examiner

*Primary Examiner* — Dangelino Gortayo
(74) *Attorney, Agent, or Firm* — Robert P. Marley

(57) ABSTRACT

Systems and methods for evaluating analytic queries comprising disjunctive Boolean expressions are described. A method may include receiving an analytic query comprising a first disjunctive Boolean expression. The method may further include transforming the analytic query to obtain a transformed analytic query comprising at least one nondisjunctive Boolean expression and at least a second disjunctive Boolean expression. The method may also include evaluating the transformed analytic query, wherein complete evaluation of the at least one nondisjunctive Boolean expressions and the at least a second disjunctive Boolean expressions yields the same results as evaluation of the first disjunctive Boolean expression.

18 Claims, 8 Drawing Sheets

```
DECLARE c19 cursor FOR
SELECT SUM(L_EXTENDEDPRICE* (1 - L_DISCOUNT)) AS REVENUE
FROM LI,
     PARTS
WHERE ( P_PARTKEY    = L_PARTKEY                                        AND
        P_BRAND      = 'Brand#12'                                       AND
        P_CONTAINER  IN ( 'SM CASE', 'SM BOX', 'SM PACK', 'SM PKG')     AND
        L_QUANTITY   >= 1                                               AND
        L_QUANTITY   <= 1 + 10                                          AND
        P_SIZE       BETWEEN 1 AND 5                                    AND
        L_SHIPMODE   IN ('AIR', 'AIR REG')                              AND
        L_SHIPINSTRUCT = 'DELIVER IN PERSON'
      )
                                OR
      ( P_PARTKEY    = L_PARTKEY                                        AND
        P_BRAND      = 'Brand#23'                                       AND
        P_CONTAINER  IN ( 'MED BAG', 'MED BOX', 'MED PKG', 'MED PACK')  AND
        L_QUANTITY   >= 10                                              AND
        L_QUANTITY   <= 10 + 10                                         AND
        P_SIZE       BETWEEN 1 AND 10                                   AND
        L_SHIPMODE   IN ('AIR', 'AIR REG')                              AND
        L_SHIPINSTRUCT = 'DELIVER IN PERSON'
      )
                                OR
      ( P_PARTKEY    = L_PARTKEY                                        AND
        P_BRAND      = 'Brand#34'                                       AND
        P_CONTAINER  IN ( 'LG CASE', 'LG BOX', 'LG PACK', 'LG PKG')     AND
        L_QUANTITY   >= 20                                              AND
        L_QUANTITY   <= 20 + 10                                         AND
        P_SIZE       BETWEEN 1 AND 15                                   AND
        L_SHIPMODE   IN ('AIR', 'AIR REG')                              AND
        L_SHIPINSTRUCT = 'DELIVER IN PERSON'
      );
EXPLAIN C19;
    DATE/TIME: 08/29/13 15:27:16  MILLISECONDS:    55636271   RUNID: 5RDMS
The access path for cursor C19 is shown below:
Relation no.  1 is TPCH1.LI:PRODUCTION.
    Brute force search applied to primary key L1.
    Nested loop join applied.
    Additional comparisons --> RSM PK :   1, RSM SI :   0, RDM :   0
Relation no.  2 is TPCH1.PARTS:PRODUCTION.
    Using 1 of 1 column  from primary key P1 : P_PARTKEY(=).
    Additional comparisons --> RSM PK :   1, RSM SI :   0, RDM :  30
------------------------------------------------------------------------------
```

FIG. 6A

```
DECLARE C19_xform cursor FOR
SELECT  SUM(L_EXTENDEDPRICE* (1 - L_DISCOUNT)) AS REVENUE
FROM LI,
     PARTS
WHERE
  P_PARTKEY = L_PARTKEY                AND   <-----------.
  P_SIZE    >= 1                       AND         | common
  L_SHIPMODE     IN ('AIR', 'AIR REG') AND         | predicates
  L_SHIPINSTRUCT = 'DELIVER IN PERSON' AND   <---------|
  (( L_QUANTITY     >= 1               AND   <---------|
     L_QUANTITY     <= 1 +10 )                         |
                              OR
   ( L_QUANTITY     >= 10              AND         | new Boolean factor
     L_QUANTITY     <= 10 + 10)                    | contains predicates
                              OR
   ( L_QUANTITY     >= 20              AND         | on table LI only
     L_QUANTITY     <= 20 + 10)        <-------------'
  )                                    AND (( P_BRAND    = 'Brand#12'           AND <-----------------------.
     P_CONTAINER IN ('SM CASE','SM BOX','SM PACK','SM PKG')   AND| new
     P_SIZE         <= 5)                                        | Boolean
                                                                 | factor
                              OR                                 | contains
   ( P_BRAND    = 'Brand#23'           AND         | predicates
     P_CONTAINER IN ('MED BAG','MED BOX','MED PKG','MED PACK') AND| on
     P_SIZE         <= 10)                                       | table
                              OR
   ( P_BRAND    = 'Brand#34'           AND         | PARTS
     P_CONTAINER IN ('LG CASE','LG BOX','LG PACK','LG PKG')   AND| only
     P_SIZE         <= 15)             <-------------------------'
  )                                    AND (( P_BRAND    = 'Brand#12'                                     AND
     P_CONTAINER IN ('SM CASE','SM BOX','SM PACK','SM PKG')      AND
     L_QUANTITY     >= 1                                         AND
     L_QUANTITY     <= 1 + 10                                    AND
     P_SIZE         <= 5)
                              OR
   ( P_BRAND    = 'Brand#23'                                     AND
     P_CONTAINER IN ('MED BAG','MED BOX','MED PKG','MED PACK')   AND
     L_QUANTITY     >= 10                                        AND
     L_QUANTITY     <= 10 + 10
     P_SIZE         <= 10)
                              OR
   ( P_BRAND    = 'Brand#34'                                     AND
     P_CONTAINER IN ('LG CASE','LG BOX','LG PACK','LG PKG')      AND
     L_QUANTITY     >= 20                                        AND
     L_QUANTITY     <= 20 + 10
     P_SIZE         <= 15)
  );

EXPLAIN C19_xform;
 The access path for cursor C19 is shown below:
 Relation no.  1 is TPCH1.PARTS:PRODUCTION.
     Brute force search applied to primary key P1.
     Additional comparisons --> RSM PK :  19, RSM SI :   0, RDM :   0
 Relation no.  2 is TPCH1.LI:PRODUCTION.
     Using  1 of  1 column  from secondary index IX1 : L_PARTKEY(=).
     Additional comparisons --> RSM PK :   9, RSM SI :   0, RDM :  24
```

FIG. 6B

HANDLING OF ANALYTIC QUERIES

FIELD OF THE DISCLOSURE

The instant disclosure relates generally to the handling of analytic queries in database systems. More specifically, this disclosure relates to improved evaluation of analytic queries that include disjunctive Boolean expressions.

BACKGROUND

Analytic queries often contain disjunctive Boolean expressions, within a, JOIN or UNION operation, that combine records from two or more tables in a database. Conventional database management systems typically evaluate an analytic query containing disjunctive Boolean expressions by dedicating one processor or software function for accessing the data tables (one table at a time) referenced in the query, filtered by any nondisjunctive Boolean expressions, and then transferring the resultant data records to a second processor or software function for evaluating the disjunctive Boolean expressions on all the transferred data records contained in the referenced tables. More specifically, in conventional database management systems, if the analytic query, i.e., a database operation command, includes disjunctive Boolean expressions that reference multiple tables, such as if the analytic query includes a JOIN predicate, the referenced tables must all be passed from an initial storage function that accesses the tables but that is only capable of evaluating single-table expressions to a relational function capable of evaluating relational expressions.

However, the performance of conventional systems suffers when many data tables need to be processed to evaluate the disjunctive Boolean expressions. For example, all the data tables needed for evaluation of the disjunctive Boolean expressions need to be retrieved from a database that can include up to millions of data records spread across two or more tables, with each table possibly including millions, or even billions, of records. In addition, all the accessed data tables then need to be transferred to another processor or software function to evaluate the disjunctive Boolean expressions in the analytic query. Consequently, many processing resources and lots of time may be consumed by conventional database systems to process analytic queries containing disjunctive Boolean expressions. Although the deficiencies described above relate to relational databases, non-relational databases suffer similar deficiencies.

SUMMARY

The performance of database systems evaluating analytic queries that include disjunctive Boolean expressions may be improved by internally transforming an analytic query so as to represent a disjunctive Boolean expression as a set of nondisjunctive Boolean expressions, such as SQL predicates referencing records of a single table, and another set of disjunctive Boolean expressions. By doing so, the nondisjunctive Boolean expressions may be evaluated first on single data tables to filter out data records that cannot meet the criteria of the original disjunctive Boolean expression because they do not meet the criteria of the nondisjunctive Boolean expressions extracted from the original disjunctive Boolean expression. As a result, less data records may be transferred to the second processor or software function, which allows the final disjunctive Boolean expressions to be evaluated faster, and yields better performance by the computer system because less processing resources are required to execute the analytic query.

According to one embodiment, a method for evaluating analytic queries that include disjunctive Boolean expressions may include receiving, with a processor, an analytic query comprising a first disjunctive Boolean expression. The method may also include transforming, with the processor, the analytic query to obtain a transformed analytic query comprising at least one nondisjunctive Boolean expression and at least a second disjunctive Boolean expression. The method may further include evaluating, with the processor, the transformed analytic query, wherein complete evaluation of the at least one nondisjunctive Boolean expressions and the at least a second disjunctive Boolean expressions yields the same results as evaluation of the first disjunctive Boolean expression.

According to another embodiment, a computer program product may include a non-transitory computer-readable medium comprising code to perform the step of receiving an analytic query comprising a first disjunctive Boolean expression. The medium may also include code to perform the step of transforming the analytic query to obtain a transformed analytic query comprising at least one nondisjunctive Boolean expression and at least a second disjunctive Boolean expression. The medium may further include code to perform the step of evaluating the transformed analytic query, wherein complete evaluation of the at least one nondisjunctive Boolean expressions and the at least a second disjunctive Boolean expressions yields the same results as evaluation of the first disjunctive Boolean expression.

According to yet another embodiment, an apparatus may include a memory and a processor coupled to the memory. The processor may be configured to execute the step of receiving an analytic query comprising a first disjunctive Boolean expression. The processor may also be configured to perform the step of transforming the analytic query to obtain a transformed analytic query comprising at least one nondisjunctive Boolean expression and at least a second disjunctive Boolean expression. The processor may be further configured to perform the step of evaluating the transformed analytic query, wherein complete evaluation of the at least one nondisjunctive Boolean expressions and the at least a second disjunctive Boolean expressions yields the same results as evaluation of the first disjunctive Boolean expression.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

FIGS. 6A-6B provide source code illustrating the transformation of an analytic query with disjunctive Boolean expressions for optimized execution by a database management system according to one embodiment of the disclosure.

DETAILED DESCRIPTION

The performance of database management systems handling analytic queries that include disjunctive Boolean expressions may be improved by transforming the analytic queries to include nondisjunctive and disjunctive Boolean expressions. A transformed analytic query may be evaluated by first performing single-table evaluations of the nondisjunctive Boolean expressions with a storage engine of a database management system, and filtering out the records that do not meet the criteria of this first evaluation. Subsequently, only the subset of tables that met the criteria of the first evaluation, i.e., met the criteria of the nondisjunctive Boolean expression, may be transferred to the relational engine to perform the multi-table relational evaluations of the disjunctive Boolean expressions of the transformed analytic query. The transforming of the analytic query to allow more single-table evaluations to be performed by the storage engine allows the storage engine to serve as an initial filter of tables. By filtering the tables, less records may be transferred from the storage engine to the relational engine, which may lead to substantial performance and time consumption reductions because the transfer and processing of data records, by the relational engine, tend to be a performance- and time-intensive tasks.

Database management systems allow for the management of data in a particular database, and for managing access to that data by many different user programs. The user programs may be written in a high level language, such as C, C++, Java, or some other analogous language. In some embodiments, the user program may perform a call to the database management system when a database operation is to be performed.

Figure 1:
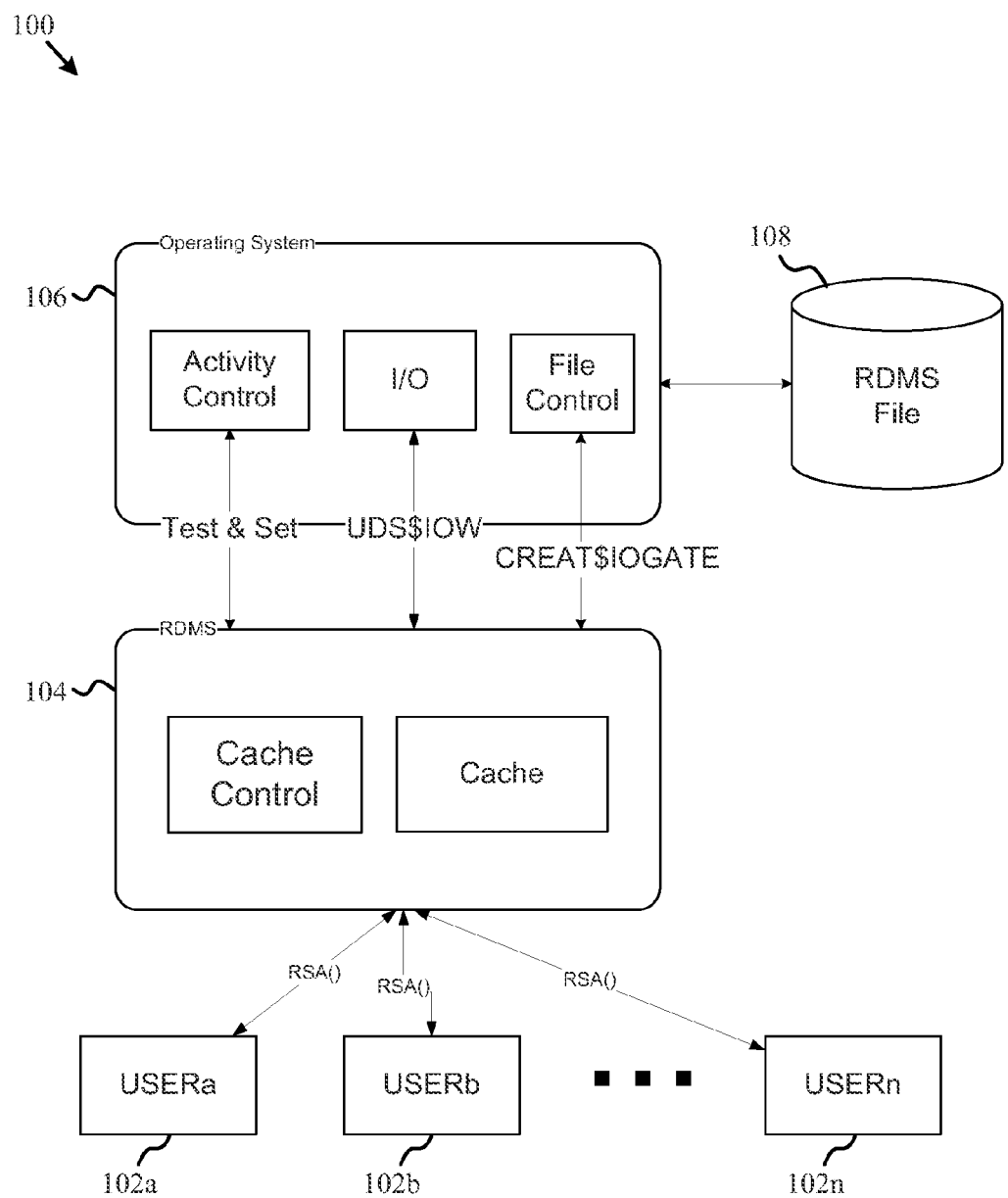
FIG. 1 is a schematic block diagram illustrating a first embodiment of a computing system including a database management system according to one embodiment of the disclosure.

FIG. 1 illustrates a system 100 for evaluating analytic queries comprising disjunctive Boolean expressions according to one embodiment of the disclosure. When a database management system receives a request to perform a database operation, it may handle the request as depicted in FIG. 1. As illustrated in FIG. 1, a system 100 may include a plurality of user applications 102a-n, from one or more of which a query statement may be received by a database management system 104. If the database management system 104 is a relational database management system the query statement can be, for example, a SQL statement. The database management system 104 may analyze the query statement to determine if there are any errors in the statement itself. Assuming that there are no errors, the database management system 104 may transmit a call to an operating system 106 hosting that system (shown as CREAT$IOGATE), requesting access to the database file 108. The operating system 106 may then assign the database file to the database management system 104. The database management system 104 then caches at least portions of the database file using subsequent system calls (e.g., UDS$IOW). This requested data may be modified by the database management system 104, and control may be returned to the user program for continued execution.

Figure 2:
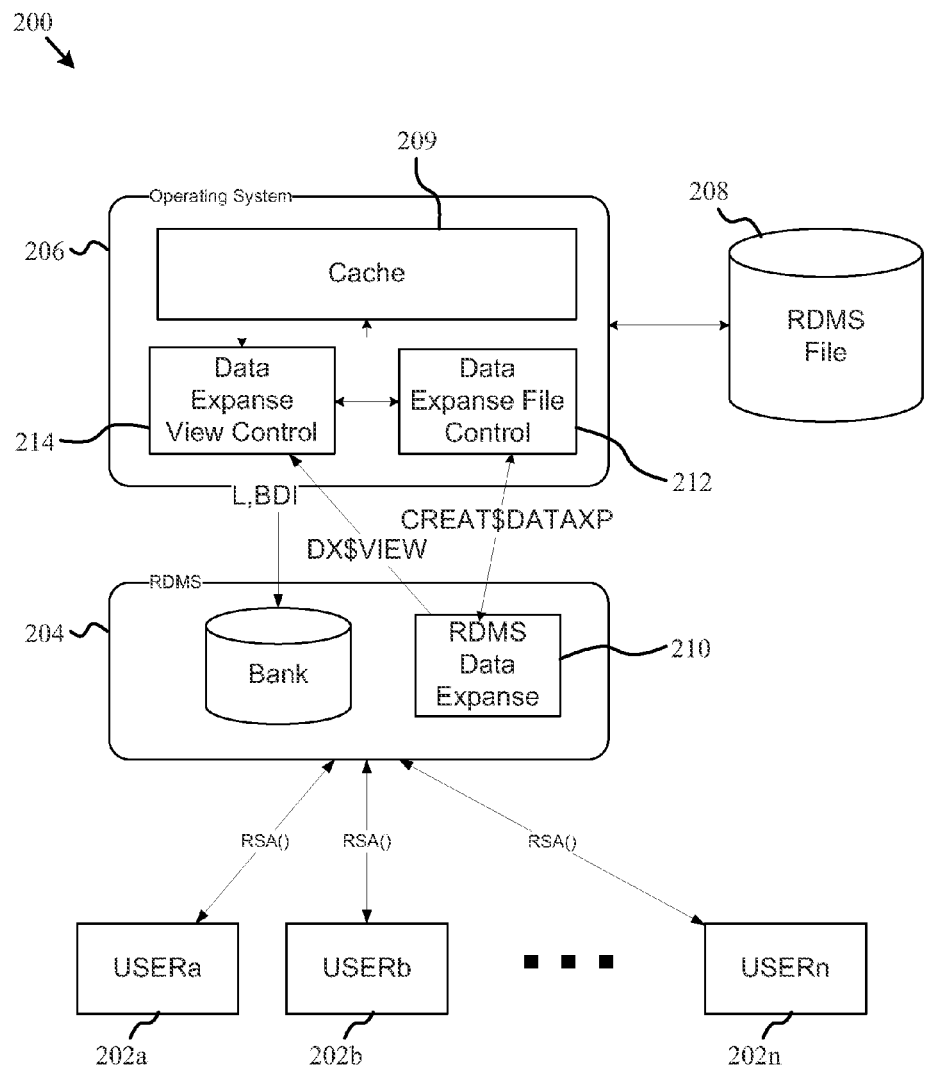
FIG. 2 is a schematic block diagram illustrating a second embodiment of a computing system including a database management system according to one embodiment of the disclosure.

FIG. 2 illustrates a second embodiment of a computing system 200 including a database management system. As shown, the system 200 may include a plurality of user applications 202a-n communicatively coupled to a database management system 204. The user applications 202a-n can be located, for example, on the same computing device as the database management system 204, or on a different computing device or devices that are communicatively connected thereto. Examples of computing devices useable to execute computing instructions constituting the user applications 202a-n and the database management system 204 are discussed below in connection with FIG. 7.

In the embodiment shown in FIG. 2, the database management system 204 may be a relational database management system configured to receive and process SQL commands to perform operations on database files. As illustrated herein, the database management system 204 may be hosted by an operating system 206, which provides access to one or more database files 208. The database management system 204 can be, for example, a possible embodiment of a database management program 104 of FIG. 1.

The operating system 206 can be any of a variety of operating systems capable of hosting a database management system 204 and which provides access controls to data stored in database files 208 on the computing system. In one example embodiment, the operating system 206 can be the OS2200 operating system, from Unisys Corporation of Blue Bell, Pa. In alternative embodiments, other operating systems could be used as well.

In the embodiment shown in FIG. 2, the database management system 204 includes a data expanse viewer 210. The data expanse viewer manages access requests for data stored in various data expanses that are managed by the operating system 206. Cooperatively, the operating system includes a data expanse file control component 212 and a data expanse view control component 214. In some embodiments, the data expanse viewer 210 can transmit a request to the operating system 206, in the form of a call to the data expanse file control component 212 to create a data expanse defined by the attributes of a database file (shown as the call CREAT$DATAXP). This call may tell the operating system 206 to create a cache 209 for the data expanse and initialize all necessary control structures and bit maps to page the cache. Once the data expanse is initialized, the database management system 204 may be returned the address callback into the operating system to access the data expanse. The data expanse file control component 212 can then load a data file 208 into a cache 209 in the operating system, and return to the data expanse viewer a public starting address of the data expanse that is created.

Following creation of the data expanse, the data expanse viewer 210 can be used by any of the user applications 202a-n to access data in the data expanse. For example, each of the user applications can request a different view of the data expanse, defined by a starting address (i.e., an offset from the starting address returned to the data expanse viewer 210, or an absolute address), as well as a size of the view to be created. This can be accomplished, for example as shown, using the operating system call DX$VIEW, providing the starting address and size of the view to be created. The data expanse view control component 214 can then create a view of the data expanse, and provide to the database management system 204 a private address of the view to be created. For example, the address can be an extended virtual mode address, including a length and a bank descriptor index to reference the location of the view.

In some embodiments, the data expanse may be referenced by its starting address or by an address of a particular segment, therefore the data expanse viewer 210 and other portions of the database management system may not need to be capable of addressing the entire range of the data expanse created. Rather, the particular view created within the data expanse may be fully addressable by the database management system 204. In this way, a database management system, such as system 204, can be made compatible with data files having sizes greater than a maximum addressable range of the database management system. For example, in some embodiments of the present disclosure, the database management system 204 may be capable of individually addressing addresses in a bank of 262 k words; in such an arrangement, the database file 208 can have a size in excess of that number, since the address identified by the database management system to the operating system 206 might identify an offset on a bank-by-bank basis, rather than on an individual, word-addressable basis.

Furthermore, using the system 200 as illustrated, a bank may be made accessible to the database management system 204 without requiring that the database management system cache each database file; this allows the operating system 206 to maintain cache management, which can be performed more efficiently when managed at the operating system level. Still further, and in contrast to locking a bank (and corresponding database file) to a particular application, the data expanse arrangement of FIG. 2 may allow a database file to be individually accessed by many different user applications 202a-n concurrently. By providing a private view into a publicly accessible database file the database management system 204 and operating system 206 may alleviate many possible data conflicts.

Figure 3:
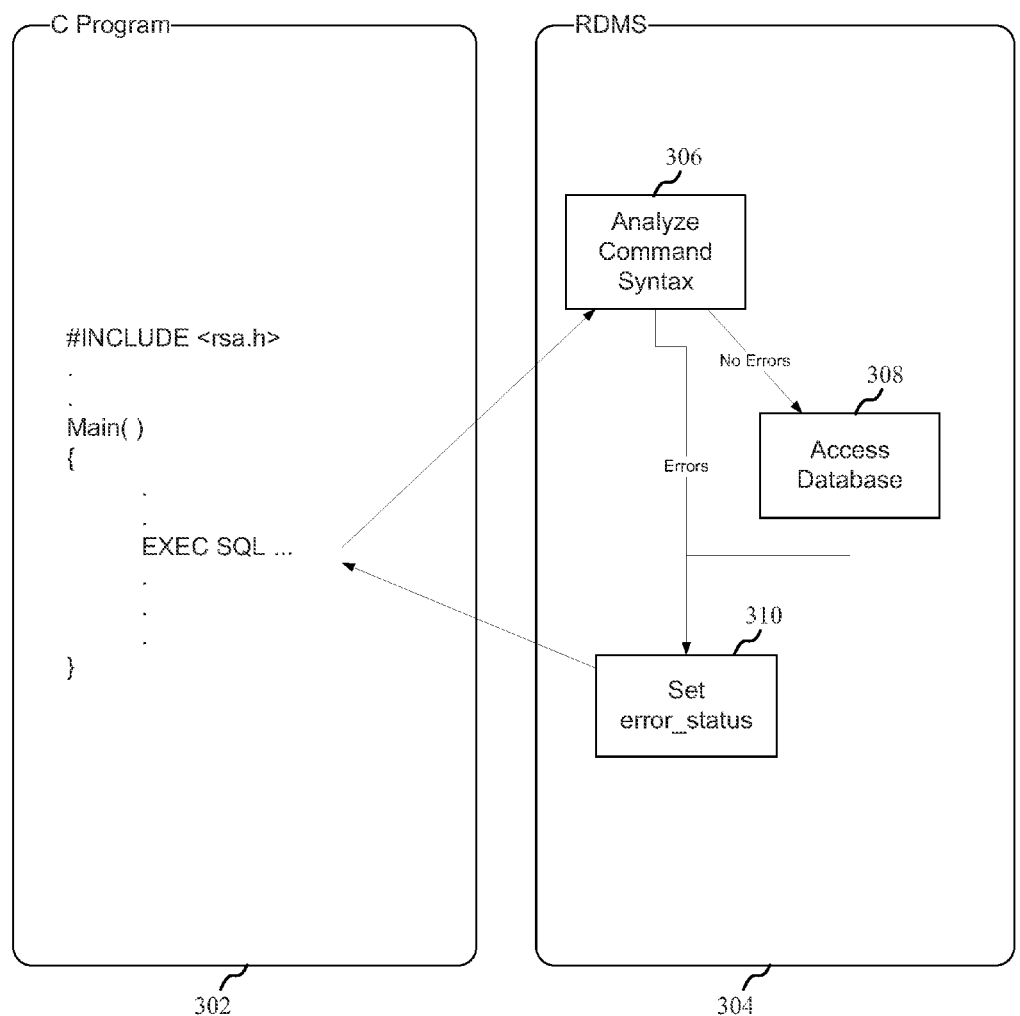
FIG. 3 is a schematic view illustrating a user application interface to a database management system and the handling of analytic queries at the database management system according to one embodiment of the disclosure.

FIG. 3 illustrates a user application interface to a database management system and the handling of analytic queries at the database management system according to one embodiment of the disclosure. In the embodiment shown, a user application 302 includes code, which can be written, for example, in C (as shown), or any of a variety of other types of programming languages, such as C++, Java, or other languages. The user application 302 may include a call to a database management program 304 within the code of the application, to effect access to a database, e.g., to read or edit data in the database managed by the database management program 304. In the example embodiment shown, the user application 302 includes a line of code in the C programming language indicated as "EXEC SQL . . . " which may represent a form of a line of code useable to call the database management program 304. In various embodiments, the user application 302 can be any of a variety of user applications useable to access and/or modify data in a database.

The database management program 304 can be any program implementing a database management system that is hosted by an underlying operating system. In an example embodiment, the database management program may correspond to a relational database management system, such as the relational database management system (RDMS) available from Unisys Corporation of Blue Bell, Pa. In alternative embodiments, other types of database management systems, and other arrangements of databases, could be used as well.

In the embodiment shown, the database management program 304 may include a syntax analyzer component 306, an access component 308, and an error status component 310. The components 306-310 may be used to access and validate access requests to data on behalf of the user application 302 by the database management program 304. The syntax analyzer component 306 may receive a database command from the user application 302, such as a SQL command, or other database command that will allow the application program to select, delete, insert, and update data in a database. In some embodiments, the syntax analyzer component 306 may determine an operation to be performed based on parsing of the received command.

If no errors are detected in the command, the access component 308 may interface with an underlying operating system to access a file containing data associated with the database accessed by the user application 302 for parsing and use by the database management program 304. The access component 308 can then execute the database command as defined in the received command. In such a case, an error status component 310 may be set to indicate that no error has occurred in completion of the database operation. However, if an error is detected in the syntax analyzer component 306, or during performance of the command by the access component 308, error status component 310 may indicate that an error exists in the received database command. Accordingly, either a confirmation of the properly executed database command, or an indication of an error, can be returned from the error status component 310 to the user application 302.

In some embodiments, beyond passage of particular database commands from the user application 302, it is also possible for the database management program 304 to allow use of placeholder variables in a command string, and therefore transfer values from program variables in the C code of the program to the database, or from the database to program variables in the C code, thereby integrating the database as a mechanism for storage of large program constructs, such as variables of large size, variable classes, and other data structures used as variables and for which storage in a database is convenient.

Figure 4:
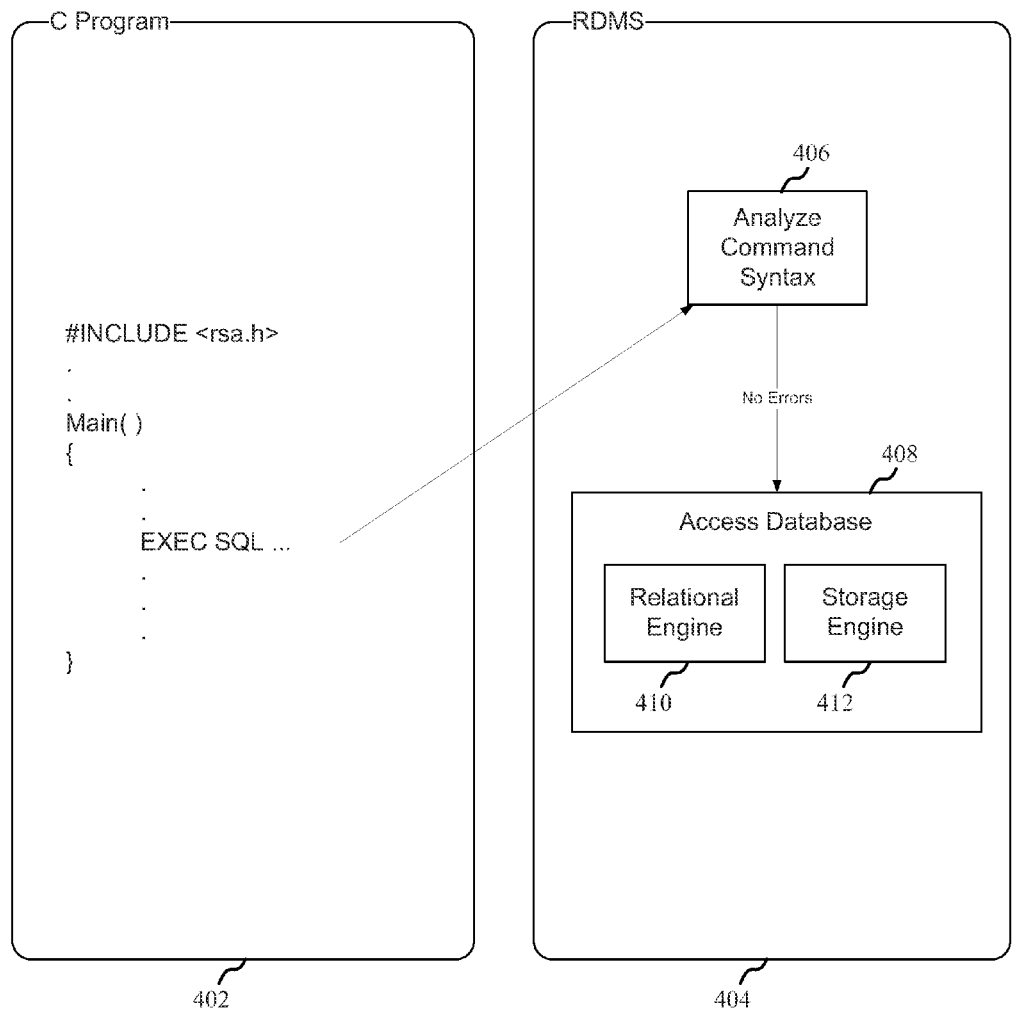
FIG. 4 is a schematic block diagram illustrating a user application interface to a database management system and components of an access database of the database management system that handle execution of analytic queries according to one embodiment of the disclosure.

FIG. 4 illustrates a user application interface to a database management system and components of an access database of the database management system that handle execution of analytic queries. In the embodiment shown in FIG. 4, the database management program 404 may include a syntax analyzer component 406 and an access component 408. The access component may include a relational engine 410 and a storage engine 412. In some embodiments, the relational engine 410 and the storage engine 412 may execute on different processors. In another embodiment, the relational engine 410 and the storage engine 412 may execute as different functions on the same processor on which the access component 408 executes. In one embodiment, the relational engine 410 may be an Abstract Machine (AB) and the storage engine 412 may be a Relational Storage Manager (RSM). Alternatively, other types of database management systems, and other arrangements of databases, could be used as well.

In some embodiments, the syntax analyzer component 406 may determine an operation to be performed based on parsing of a command received from a user application 402, which may function similar to user application 302. According to an embodiment, if the syntax analyzer component 406 detects no error in the received database command, the database command may be executed by the access database component 408. The access database component 408 may utilize a relational engine 410 and a storage engine 412 to perform the database operations specified in the received database command. According to an embodiment, the relational engine 410 may be utilized to implement relational algorithms, such as, for example, SQL JOIN, UNION, or UNION ALL, that combine records from two or more tables in the database, such as database 108 or 208. The storage engine 412 may be utilized to execute SQL predicates that reference records of a single table. To execute database operations, the relational engine 410 may call the storage engine 412 to retrieve records from a single table that match certain criteria, such as criteria specified in a database operation command received from the user application 402.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
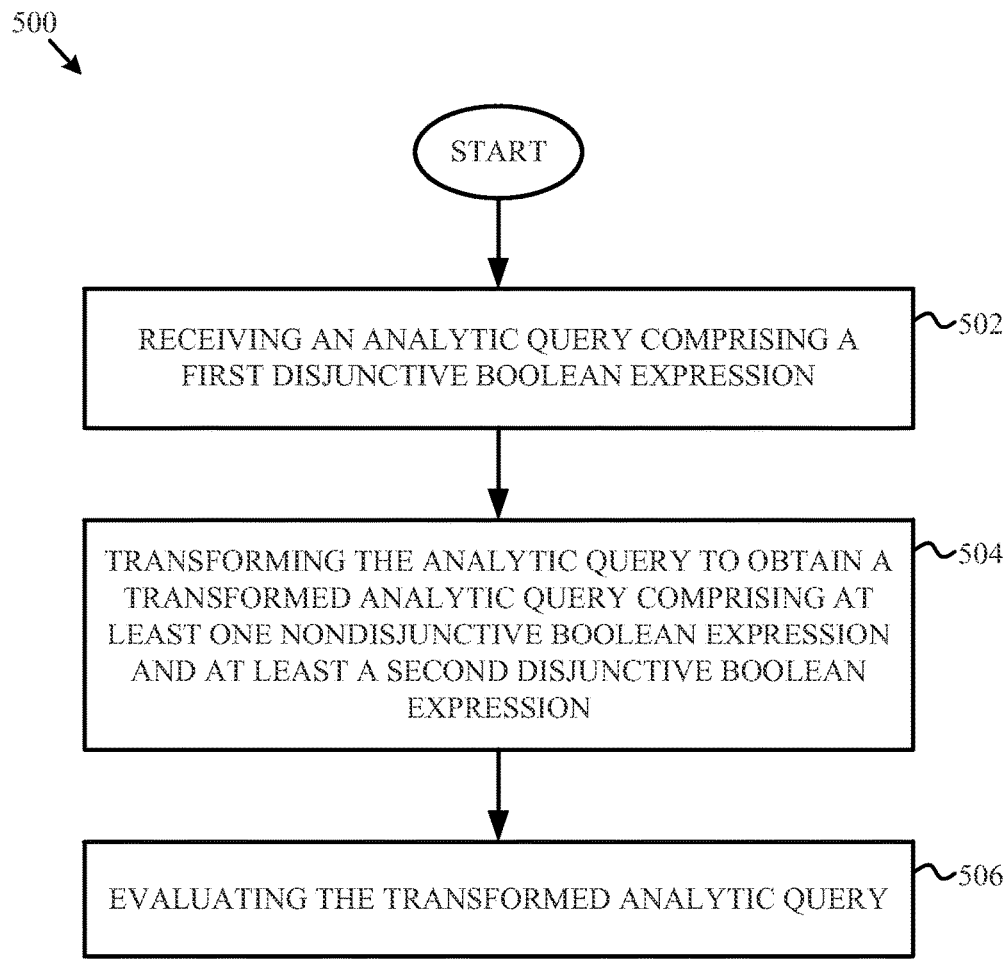
FIG. 5 is a flow chart illustrating a method for evaluating analytic queries including disjunctive Boolean expressions according to one embodiment of the disclosure.

FIG. 5 illustrates a method 500 for evaluating analytic queries that include disjunctive Boolean expressions. Embodiments of method 500 may be implemented with the systems described above with respect to FIGS. 1-4. Specifically, method 500 includes, at block 502, receiving an analytic query that includes a first disjunctive Boolean expression. In some embodiments, a processor on which a database management system, such as database management systems 104, 204, 304, or 404, executes may receive the analytic query. According to an embodiment, the received analytic query may specify a plurality of data tables, each of which may include numerous data records, to be evaluated in accordance with the first disjunctive Boolean expression. For example, the first disjunctive Boolean expression may require the processing of at least two data tables of the plurality of data tables to evaluate the first disjunctive Boolean expression.

According to an embodiment, the processor may be configured to, upon receiving the analytic query, retrieve the plurality of data tables referenced by the first disjunctive Boolean expression of the analytic query. For example, the data tables may be retrieved from a database, such as database 108 or 208.

At block 504, method 500 includes transforming the analytic query to obtain a transformed analytic query comprising at least one nondisjunctive Boolean expression and at least a second disjunctive Boolean expression. That is, the analytic query may be transformed such that the first disjunctive Boolean expression is represented as a combination of nondisjunctive, i.e., non-relational Boolean expressions, and disjunctive Boolean expressions, i.e., relational Boolean expressions. In some embodiments, the transformation may be performed by an analytic query syntax analyzer function of a database management system, such as syntax analyzer component 306 or 406. In addition, in some embodiments, a nondisjunctive Boolean expression may refer to a SQL predicate that does not reference multiple data tables, thereby making the nondisjunctive Boolean expression a non-relational Boolean expression. Therefore, in some embodiments, a nondisjunctive Boolean expression may be a Boolean expression that may be evaluated using only single-table processing. As mentioned, this is in contrast to a disjunctive Boolean expression, which references multiple tables of a database, thereby making it a multi-table relational Boolean expression.

Method 500 further includes, at block 506, evaluating the transformed analytic query. In some embodiments, complete evaluation of the combination of nondisjunctive and disjunctive Boolean expressions that make up the transformed analytic query may yield the same results as the evaluation of the first disjunctive Boolean expression.

According to an embodiment, evaluation of the transformed analytic query, such as at block 506, may include evaluating each of the at least one nondisjunctive Boolean expressions. In some embodiments, evaluation of a nondisjunctive Boolean expression may require the processing of only a single data table of the plurality of data tables. For example, upon retrieving a single data table referenced by the original disjunctive Boolean expression of the original received analytic query, the single data table may be processed to completely evaluate one of the at least one nondisjunctive Boolean expressions. Because the nondisjunctive Boolean expression is a Boolean expression derived from the original disjunctive Boolean expression of the analytic query, if a data table does not satisfy the criteria of the nondisjunctive Boolean expression, then the data table may be disregarded such that no further processing is performed on the data table to evaluate the original disjunctive Boolean expression of the analytic query.

Evaluation of the transformed analytic query, such as at block 506, may also include filtering the plurality of data tables to obtain a subset of the plurality of data tables. According to one embodiment, the subset of data tables may be data tables processed for the evaluation of each of the at least one nondisjunctive Boolean expressions and for which the evaluation of the data tables yielded a first Boolean value. For example, each of the data tables referenced by the original disjunctive Boolean expression of the original received analytic query may be processed to evaluate whether they yield a first Boolean value, such as a Boolean value of TRUE indicating that the data table meets all of the criteria of the nondisjunctive Boolean expression. Data tables yielding the first Boolean value, that is, a value of TRUE, may be grouped to create the subset of data tables to be further processed. The data tables not yielding the first Boolean value, such as those yielding a Boolean value of FALSE indicating that the data tables do not meet all the criteria of the nondisjunctive Boolean expression, may be disregarded, and thereby filtered out from any further processing.

In some embodiments, evaluation of the transformed analytic query, such as at block 506, may further include evaluating each of the at least a second disjunctive Boolean expressions. In some embodiments, evaluation of each of the at least a second disjunctive Boolean expressions may require the processing of at least two data tables from the subset of data tables. In other words, in some embodiments, only the data tables that yielded a Boolean value of TRUE when evaluated with the nondisjunctive Boolean expressions may be evaluated with the subset of disjunctive Boolean expressions derived from the original disjunctive Boolean expression of the analytic query. According to an embodiment, completion of the evaluating of each of the at least a second disjunctive Boolean expressions may yield the same result as the evaluation of the first disjunctive Boolean expression, except that less processing resources may have been used and less time may have been consumed to arrive at the same result.

In essence, by evaluating the data tables with the nondisjunctive Boolean expressions and filtering out the data tables that do not meet the criteria of the nondisjunctive Boolean expressions, less data tables may require evaluation with disjunctive Boolean expressions than if the analytic query had not been transformed, such as at block 504, because without the transformation all the data tables would need to have been evaluated with the original disjunctive Boolean expressions. Because evaluating data tables with disjunctive Boolean expressions instead of nondisjunctive Boolean expressions requires more processing power and time, evaluating data tables in accordance with method 500 may be advantageous to conventional systems for evaluating analytic queries containing disjunctive Boolean expressions.

In some embodiments, processing of the data tables to evaluate the nondisjunctive Boolean expressions and to evaluate the disjunctive Boolean expressions may be performed with a single processor. For example, the evaluation of the nondisjunctive and disjunctive Boolean expressions may be performed with a processor on which a database management system executes. In such embodiments, a database management system may utilize a relational engine function, such as relational engine 410, and a storage engine function, such as storage engine 412, to completely evaluate the first disjunctive Boolean expression of the original analytic query or the combination of nondisjunctive and disjunctive Boolean expressions that make up the transformed analytic query.

In other embodiments, evaluating each of the at least one nondisjunctive Boolean expressions may include evaluating with a first subprocessor of a processor, and evaluating each of the at least a second disjunctive Boolean expressions may include evaluating with a second subprocessor of the processor. In other words, a first processor may be used to process data tables a first time to evaluate the nondisjunctive Boolean expressions, and a second processor may be used to process a subset of the data tables a second time to evaluate the disjunctive Boolean expressions, such as at block 410. As an example, a database management system may include multiple processors. The storage engine may execute on one processor to evaluate each of the at least one nondisjunctive Boolean expressions, and the relational engine may execute on another processor to evaluate each of the at least a second disjunctive Boolean expressions. In some embodiments, the database management system that includes the relational engine and the storage engine may execute on one of the processors that executes either the storage engine or the relational engine. In other embodiments, the database management system may execute on a processor part of a larger server system that includes the relational engine processor and the storage engine processor.

In embodiments in which separate processors are used for the storage engine and the relational engine, only the subset of tables may be transferred from the first subprocessor, i.e., the storage engine processor, to the second subprocessor, i.e., the relational engine processor. Transferring only the subset of data records may prevent transfer of data records that are sure to not meet the criteria of the original disjunctive Boolean expression because if they do not meet the criteria of the nondisjunctive Boolean expressions, which are derived from the original first disjunctive Boolean expression, the data tables may not meet the criteria of the original first disjunctive Boolean expression. By not transferring the data records sure to not meet the criteria of the original disjunctive Boolean expressions of the analytic query, the processing and time intensive task of data transfer may be reduced, thereby further improving processor performance and time consumption.

The schematic flow chart diagram of FIG. 5 is generally set forth as a logical flow chart diagram. As such, the depicted order and labeled steps are indicative of one aspect of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIGS. 6A-6B provide source code illustrating the transformation of an analytic query with disjunctive Boolean expressions for optimized execution by a database management system according to one embodiment of the disclosure. In particular, FIG. 6A illustrates source code for a received SQL analytic TPCH query (query 19). FIG. 6B illustrates the resulting source code after the received SQL analytic TPCH query has been transformed, such as by the method of FIG. 5, and includes comments describing features of the resultant source code. Both queries, i.e., the original received analytic query and the transformed analytic query, may have the same access path generated by an RDMS optimizer, such as syntax analyzer component 306 or 406. The access path for the original received analytic query and the transformed analytic query are provided at the end of the source code illustrated in FIG. 6A and FIG. 6B, respectively.

Although FIGS. 5 and 6 describe embodiments in which the analytic query is a SQL database operation command, the embodiments of this disclosure are not limited to SQL. For example, the embodiments of this disclosure may also be applicable to the Hadoop NoSQL language Pig. In general, the embodiments of this disclosure may be applicable to various database command languages so long as they perform the functions as specified in the appended claims.

Figure 7:
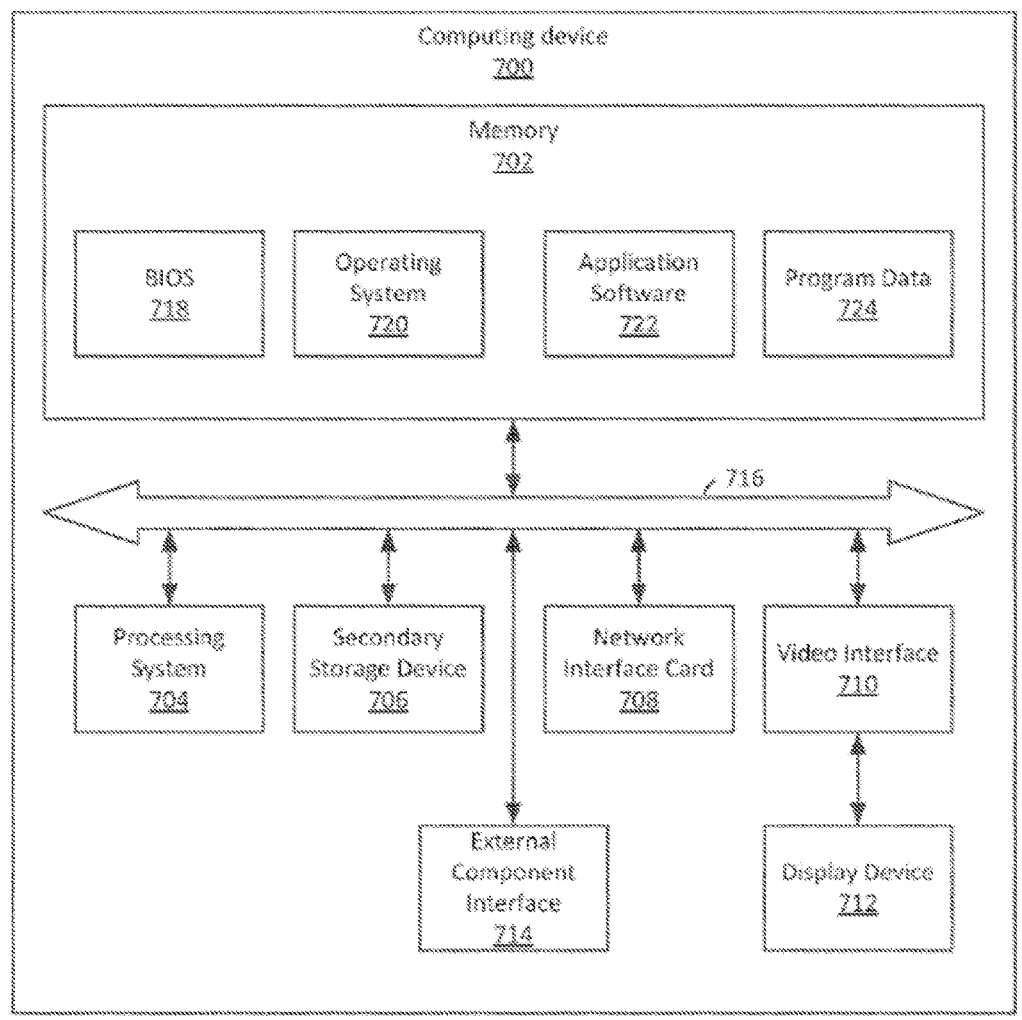
FIG. 7 is a schematic block diagram illustrating an electronic computing device with which aspects of the present disclosure can be implemented according to one embodiment of the disclosure.

FIG. 7 illustrates an electronic computing device with which aspects of the present disclosure can be implemented according to one embodiment of the disclosure. In particular, the computing device 700 can represent a native computing device, such as a computing system on which any of a variety of the systems of FIGS. 1-4 can be implemented.

In the embodiment of FIG. 7, the computing, device 700 may include a memory 702, a processing system 704, a secondary storage device 706, a network interface card 708, a video interface 710, a display unit 712, an external component interface 714, and a communication medium 716. The memory 702 may include one or more computer storage media capable of storing data and/or instructions. In different embodiments, the memory 702 may be implemented in different ways. For example, the memory 702 can be implemented using various types of computer storage media.

The processing system 704 may include one or more processing units. A processing unit is a physical device or article of manufacture comprising one or more integrated circuits that selectively execute software instructions. The processing system 704 can be implemented in various ways. For example, the processing system 704 can be implemented as one or more processing cores. In another example, the processing system 704 can include one or more separate microprocessors. In yet another example embodiment, the processing system 704 can include an application-specific integrated circuit (ASIC) that provides specific functionality. In yet another example, the processing system 704 may provide specific functionality by using an ASIC and by executing computer-executable instructions.

The secondary storage device 706 may include one or more computer storage media. The secondary storage device 706 may store data and software instructions not directly accessible by the processing system 704. In other words, the processing system 704 may perform an I/O operation to retrieve data and/or software instructions from the secondary storage device 706. In various embodiments, the secondary storage device 706 includes various types of computer storage media. For example, the secondary storage device 706 can include one or more magnetic disks, magnetic tape drives, optical discs, solid state memory devices, and/or other types of computer storage media.

The network interface card 708 may allow the computing device 700 to send data to and receive data from a communication network. In different embodiments, the network interface card 708 may be implemented in different ways. For example, the network interface card 708 can be implemented as an Ethernet interface, a token-ring network interface, a fiber optic network interface, a wireless network interface (e.g., Wi-Fi, WiMax, etc.), or another type of network interface.

The video interface 710 may allow the computing device 700 to output video information to the display unit 712. The display unit 712 can be various types of devices for displaying video information, such as a cathode-ray tube display, an LCD display panel, a plasma screen display panel, a touch-sensitive display panel, an LED screen, or a projector. The video interface 710 can communicate with the display unit 712 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 714 may allow the computing device 700 to communicate with external devices. For example, the external component interface 714 can be a USB interface, a FireWire interface, a serial port interface, a parallel port interface, a PS/2 interface, and/or another type of interface that enables the computing device 700 to communicate with external devices. In various embodiments, the external component interface 714 may allow the computing device 700 to communicate with various external components, such as external storage devices, input devices, speakers, modems, media player docks, other computing devices, scanners, digital cameras, and fingerprint readers.

The communications medium 716 may facilitate communication among the hardware components of the computing device 700. In the example of FIG. 7, the communications medium 716 may facilitate communication among the memory 702, the processing system 704, the secondary storage device 706, the network interface card 708, the video interface 710, and the external component interface 714. The communications medium 716 can be implemented in various ways. For example, the communications medium 716 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 may store various types of data and/or software instructions. For instance, the memory 702 may store a Basic Input/Output System (BIOS) 718 and an operating system 720. The BIOS 718 may include a set of computer-executable instructions that, when executed by the processing system 704, cause the computing device 700 to boot up. The operating system 720 may include a set of computer-executable instructions that, when executed by the processing system 704, cause the computing device 700 to provide an operating system that coordinates the activities and sharing of resources of the computing device 700. Furthermore, the memory 702 may store application software 722. The application software 722 may include computer-executable instructions, that when executed by the processing system 704, cause the computing device 700 to provide one or more applications. The memory 702 also stores program data 724. The program data 724 may be data used by programs that execute on the computing device 700.

Although particular features are discussed herein as included within an electronic computing device 700, it is recognized that in certain embodiments not all such components or features may be included within a computing device executing according to the methods and systems of the present disclosure. Furthermore, different types of hardware and/or software systems could be incorporated into such an electronic computing device.

Those of skill would appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

In some embodiments, the techniques or steps of a method described in connection with the aspects disclosed herein may be embodied directly in hardware, in software executed by a processor, or in a combination of the two. In some embodiments, a processor, as referred to herein, may be a single processor or a processor comprised of multiple processors, which can be referred to as subprocessors of the processor. In addition, different processors may be designed differently and may perform different functions, but variations in the design or functionality of the processor should not be interpreted as deviations from the processors of this disclosure so long as the processors are capable of substantially performing the functions of the processors described herein. In some aspects of the disclosure, any software module, software layer, or thread described herein may comprise an engine comprising firmware or software and hardware configured to perform aspects of the described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details or interrelationships between embodiments, but rather are to be defined by the appended claims.

Although the present disclosure and its advantages have been described in detail, it should be understood that various changes, substitutions and alterations can be made herein without departing from the spirit and scope of the disclosure as defined by the appended claims. For example, although certain examples above describe either relational or non-relational database systems, aspects of the disclosure above may be applied to either relational or non-relational database systems. Thus, description of "records" of a relational database also apply to "values" of a non-relational database, and description of "tables" of a relational database also apply to "files" of a non-relational database. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for evaluating analytic queries comprising disjunctive Boolean expressions, comprising:
   receiving, with a processor, an analytic query comprising a first disjunctive Boolean expression;
   transforming, with the processor, the analytic query to obtain a transformed analytic query comprising at least one nondisjunctive Boolean expression and at least a second disjunctive Boolean expression; and
   evaluating, with the processor, the transformed analytic query, wherein complete evaluation of the at least one nondisjunctive Boolean expressions and the at least a second disjunctive Boolean expressions yields the same results as evaluation of the first disjunctive Boolean expression,
   wherein evaluation of the at least one nondisjunctive Boolean expression comprises retrieving and processing of a single data table referenced by the first disjunctive Boolean expression of the analytic query, and wherein no processing is performed on the data table when the data table does not satisfy a criteria of the nondisjunctive Boolean expression.

2. The method of claim 1, wherein the received analytic query specifies a plurality of data tables comprising one or more records to be evaluated in accordance with the first disjunctive Boolean expression.

3. The method of claim 2, wherein the first disjunctive Boolean expression requires the processing of at least two data tables of the plurality of data tables to evaluate the first disjunctive Boolean expression.

4. The method of claim 2, wherein evaluating the transformed analytic query comprises:
evaluating each of the at least one nondisjunctive Boolean expressions, wherein evaluation of a nondisjunctive Boolean expression requires the processing of only a single data table of the plurality of data tables;
filtering the plurality of data tables to obtain a subset of the plurality of data tables, wherein the subset of data tables comprises data tables processed for the evaluation of each of the at least one nondisjunctive Boolean expressions and for which the evaluation of the data tables yielded a first Boolean value; and
evaluating each of the at least a second disjunctive Boolean expressions, wherein evaluation of each of the at least a second disjunctive Boolean expressions requires the processing of at least two data tables from the subset of data tables.

5. The method of claim 4, wherein evaluating each of the at least one nondisjunctive Boolean expressions comprises evaluating with a first subprocessor of the processor, and wherein evaluating each of the at least a second disjunctive Boolean expressions comprises evaluating with a second subprocessor of the processor.

6. The method of claim 5, further comprising transferring the subset of data tables from the first subprocessor to the second subprocessor.

7. A computer program product, comprising: a non-transitory computer-readable medium comprising instructions which, when executed by a processor of a computing system, cause the processor to perform the steps of:
receiving an analytic query comprising a first disjunctive Boolean expression;
transforming the analytic query to obtain a transformed analytic query comprising at least one nondisjunctive Boolean expression and at least a second disjunctive Boolean expression; and
evaluating the transformed analytic query, wherein complete evaluation of the at least one nondisjunctive Boolean expressions and the at least a second disjunctive Boolean expressions yields the same results as evaluation of the first disjunctive Boolean expression, wherein evaluation of the at least one nondisjunctive Boolean expression comprises retrieving and processing of a single data table referenced by the first disjunctive Boolean expression of the analytic query, and wherein no processing is performed on the data table when the data table does not satisfy a criteria of the nondisjunctive Boolean expression.

8. The computer program product of claim 7, wherein the received analytic query specifies a plurality of data tables comprising one or more records to be evaluated in accordance with the first disjunctive Boolean expression.

9. The computer program product of claim 8, wherein the first disjunctive Boolean expression requires the processing of at least two data tables of the plurality of data tables to evaluate the first disjunctive Boolean expression.

10. The computer program product of claim 8, wherein the medium further comprises instructions to cause the processor to perform the steps of:
evaluating each of the at least one nondisjunctive Boolean expressions, wherein evaluation of a nondisjunctive Boolean expression requires the processing of only a single data table of the plurality of data tables;
filtering the plurality of data tables to obtain a subset of the plurality of data tables, wherein the subset of data tables comprises data tables processed for the evaluation of each of the at least one nondisjunctive Boolean expressions and for which the evaluation of the data tables yielded a first Boolean value; and
evaluating each of the at least a second disjunctive Boolean expressions, wherein evaluation of each of the at least a second disjunctive Boolean expressions requires the processing of at least two data tables from the subset of data tables.

11. The computer program product of claim 10, wherein evaluating each of the at least one nondisjunctive Boolean expressions comprises evaluating with a first subprocessor of the processor, and wherein evaluating each of the at least a second disjunctive Boolean expressions comprises evaluating with a second subprocessor of the processor.

12. The computer program product of claim 11, wherein the medium further comprises instructions to cause the processor to perform the step of transferring the subset of data tables from the first subprocessor to the second subprocessor.

13. An apparatus, comprising: a memory; and a processor coupled to the memory, the processor configured to execute the steps of:
receiving an analytic query comprising a first disjunctive Boolean expression;
transforming the analytic query to obtain a transformed analytic query comprising at least one nondisjunctive Boolean expression and at least a second disjunctive Boolean expression; and
evaluating the transformed analytic query, wherein complete evaluation of the at least one nondisjunctive Boolean expressions and the at least a second disjunctive Boolean expressions yields the same results as evaluation of the first disjunctive Boolean expression, wherein evaluation of the at least one nondisjunctive Boolean expression comprises retrieving and processing of a single data table referenced by the first disjunctive Boolean expression of the analytic query, and wherein no processing is performed on the data table when the data table does not satisfy a criteria of the nondisjunctive Boolean expression.

14. The apparatus of claim 13, wherein the received analytic query, specifies a plurality of data tables comprising one or more records to be evaluated in accordance with the first disjunctive Boolean expression.

15. The apparatus of claim 14, wherein the first disjunctive Boolean expression requires the processing of at least two data tables of the plurality of data tables to evaluate the first disjunctive Boolean expression.

16. The apparatus of claim 14, wherein the processor is further configured to perform the steps of:
evaluating each of the at least one nondisjunctive Boolean expressions, wherein evaluation of a nondisjunctive Boolean expression requires the processing of only a single data table of the plurality of data tables;
filtering the plurality of data tables to obtain a subset of the plurality of data tables, wherein the subset of data tables comprises data tables processed for the evaluation of each of the at least one nondisjunctive Boolean expressions and for which the evaluation of the data tables yielded a first Boolean value; and
evaluating each of the at least a second disjunctive Boolean expressions, wherein evaluation of each of the at least a second disjunctive Boolean expressions requires the processing of at least two data tables from the subset of data tables.

17. The apparatus of claim 16, wherein evaluating each of the at least one nondisjunctive Boolean expressions comprises evaluating with a first subprocessor of the processor, and wherein evaluating each of the at least a second disjunctive Boolean expressions comprises evaluating with a second subprocessor of the processor.

18. The apparatus of claim 17, wherein the subset of data tables are transferred from the first subprocessor to the second subprocessor.

\* \* \* \* \*